United States Patent [19]

Takahashi

[11] 4,279,677
[45] Jul. 21, 1981

[54] METHOD OF MEANS FOR JOINING PLASTIC FASTENER STRIP TO FILM

[75] Inventor: Katsuhito Takahashi, Shizuoka, Japan

[73] Assignee: Seissan Nippon-Sha K. K., Tokyo, Japan

[21] Appl. No.: 94,763

[22] Filed: Nov. 16, 1979

[51] Int. Cl.³ .................. B29D 7/08; B32B 7/04; B32B 31/16

[52] U.S. Cl. .................................... 156/160; 150/3; 156/91; 156/163; 156/164; 156/229; 156/243; 156/244.11; 156/494; 156/498; 156/500

[58] Field of Search ............. 156/91, 92, 160, 163, 156/164, 200, 201, 212, 229, 244.11, 244.23, 244.24, 243, 494, 498, 500; 150/3

[56] References Cited

U.S. PATENT DOCUMENTS

| | | | |
|---|---|---|---|
| 3,532,571 | 10/1970 | Ausnit | 156/91 |
| 3,784,432 | 1/1974 | Noguchi | 156/244.11 |
| 3,787,269 | 1/1974 | Noguchi | 156/498 |

*Primary Examiner*—Caleb Weston
*Attorney, Agent, or Firm*—Hill, Van Santen, Steadman, Chiara & Simpson

[57] ABSTRACT

A method of an apparatus for joining plastic fastener strip continuously to a film. The film of substantial width is run continuously longitudinally through a joining station. A selected longitudinal area of the film is maintained in a stable tensioned condition relative to the remainder of the film as it runs through the joining station. In the joining station, there is joined and secured to the tensioned area a fastener strip running in the same direction and at the same speed as the film. The selected area tensioning is effected by maintaining such area offset relative to the remainder of the film. Downstream from the joining station the film and fastener strip assembly is progressively conditioned until thoroughly stabilized.

25 Claims, 8 Drawing Figures

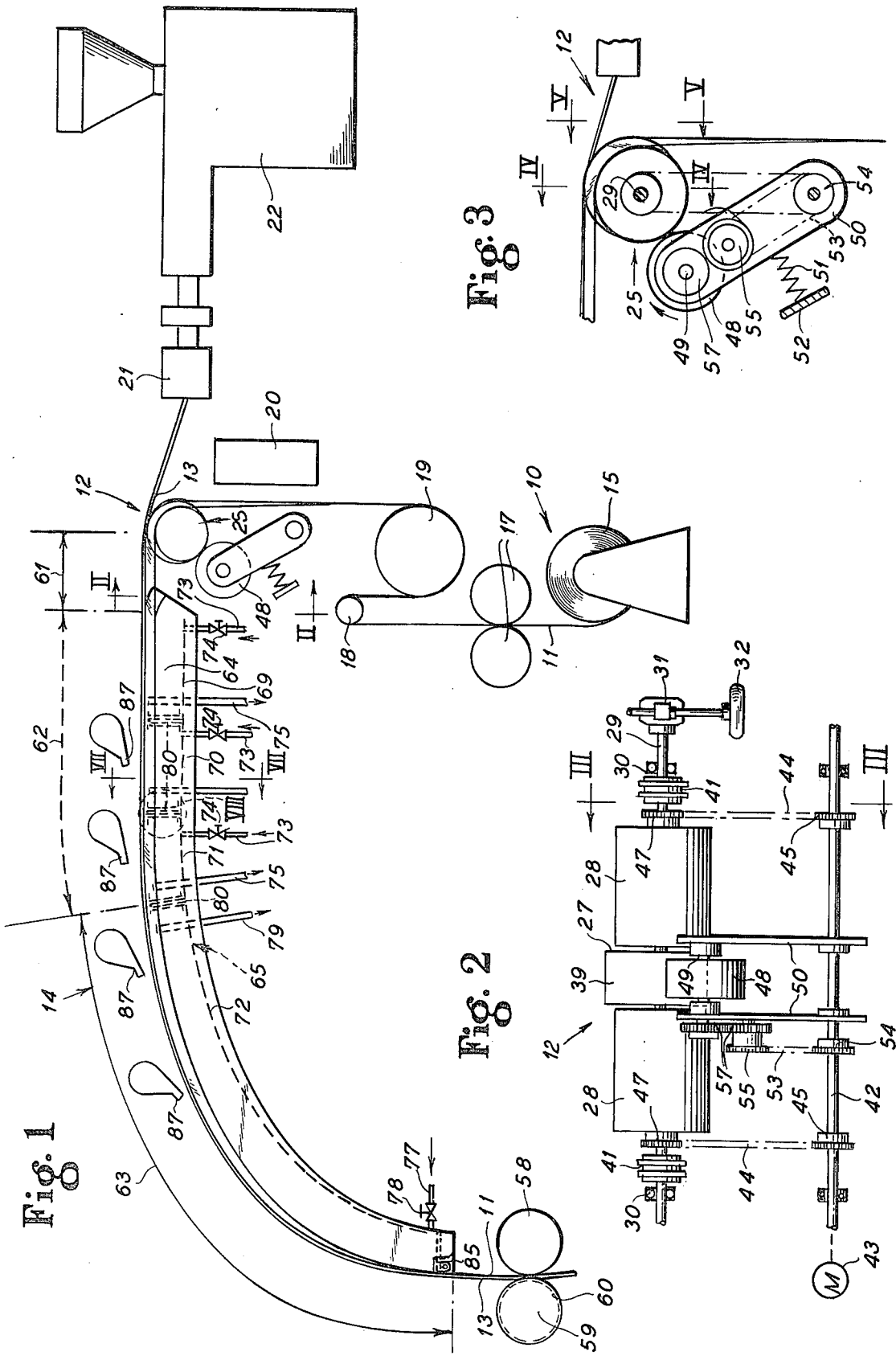

METHOD OF MEANS FOR JOINING PLASTIC FASTENER STRIP TO FILM

This invention relates to improvements in joining plastic fastener strip to film in a continuous and automatic manner, and is more particularly concerned with providing thin plastic film equipped with separable fastener profiles, especially useful for producing reclosable plastic bags.

A desirable material for making reclosable bags comprises a single layer or multi-layer plastic film to which has been attached one or more plastic strips carrying fastener profiles of the type comprising a female profile and a male profile which are adapted to be coupled for closing the bag and are adapted to be separated by pulling apart to open the bag. Successful joining of preformed plastic film and preformed profile carrying fastener strips presented problems which were substantially solved according to the teachings of U.S. Pat. Nos. 3,784,432 and 3,787,269. Those patents teach a method of and provide apparatus for heating a preformed sheet or film to a temperature sufficient to permit fusion to a plastic strip but less than the deterioration temperature of the film. An extruded plastic strip of heated plastic material having the desired profile shape thereon is immediately directed against the sheet at a joining zone while the plastic is hot, so that the profile strip is fused to the surface of the heated sheet.

However, while the method and apparatus disclosed in the aforesaid patents successfully attain joining of the plastic film or sheet and the fastener strips, some difficulties have been encountered, in that wrinkles may be formed on the fastener strips depending on the combination of the materials used and the thicknesses thereof, there may be slackness in the plastic film due to unevennesses in thickness as well as in tension, the plastic strip may expand or contract as a result of the heat of fusion where the freshly extruded fastener strip contacts the film, and there may be uneven cooling and deformation during cooling.

It is to the alleviation of such difficulties that the present invention is directed.

An important object of the present invention is to provide a new and improved method of and means for producing plastic bag making film to which a fastener strip is joined, and substantially free from undesirable deformations.

Another object of the invention is to provide a new and improved method of joining fastener strip to preformed plastic film.

A further object of the invention is to provide new and improved apparatus for the efficient substantially deformation free uniting of extruded plastic fastener strip to preformed plastic film.

Still another object of the invention is to provide new and improved method of and means for joining preformed plastic film and extruded plastic fastener strip in a continuously running manner while controlling the area of the film to which the fastener is applied by fusion substantially against distortion or deformation, so that a satisfactory end product is attained despite variables that may be present in the film or which might result from variable conditions during fusion of the fastener strip to the film.

Other objects, features and advantages of the invention will be readily apparent from the following description of a certain representative embodiment thereof, taken in conjunction with the accompanying drawings although variations and modifications may be effected without departing from the spirit and scope of the novel concepts embodied in the disclosure and in which:

FIG. 1 is a schematic side elevational view of apparatus for practicing the invention;

FIG. 2 is an enlarged fragmentary elevational detail view taken substantially in the plane of line II—II in FIG. 1;

FIG. 3 is a fragmentary, schematic sectional elevational view taken substantially along the line III—III in FIG. 2;

Figure 4:
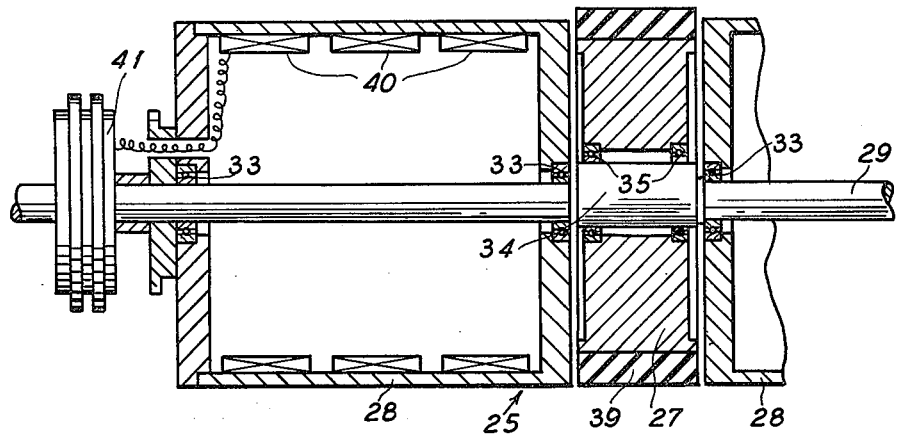
FIG. 4 is an enlarged fragmentary sectional detail view taken substantially along the line IV—IV in FIG. 3.

As shown in FIG. 1, apparatus according to the present invention for practicing the method of the present invention comprises a preformed plastic supply station 10 from which a plastic film web 11 is supplied to a joining station 12 where a plastic fastener strip 13 is joined with the web 11 while the fastener strip and the web are traveling at the same rate of speed and from which the joined film and fastener strip travel continuously through a conditioning zone 14.

In the supply station 10, the plastic film 11 is fed from a roll 15 into which the preformed film has been wound after having been formed by extrusion in any preferred or known manner. From the roll 15, the film 11 passes between complementary rotating feeder rolls 17 which are driven at a common rotary speed by any suitable driving means coordinated with other driving means in the apparatus in any known manner. Beyond the feeder rolls 17, the web of film 11 is looped over an idler tensioning roll 18 and then loops about a preheating roll 19. Beyond the roll 19, the film 11 passes a heater 20 which assures that the temperature of the film on reaching the joining station 12 will be proper for fused joining of the fastener strip 13 thereto. In a preferred arrangement, the fastener strip 13 is joined with the film 11 in a freshly extruded state promptly after leaving extrusion die means 21 associated with an extruder 22. The extruding die means 21 are located in proper relation to the joining station 12 to enable joining of the fastener strip 13 to the film 11 while the fastener strip is still in a sufficiently thermoplastic state to permit efficient fusing to the preferably correspondingly thermoplastic surface of the heated film 11. Although the fastener 13 may comprise a strip of sufficient width to carry both a male fastener profile 22 and a female profile 23 (FIGS. 5 and 7), in the present instance, each profile is shown as carried on a separate parallel fastener strip 13 providing a base for the profile and which base is adapted to be fused to the running plastic film 11. As the term "fastener" or "fastener strip" is used herein, it should be understood to mean either or both of the profiles 22 and 23 and the base strip 13 therefor.

Figure 5:
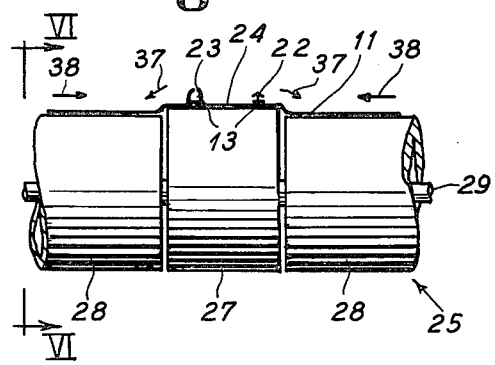
FIG. 5 is a fragmentary elevational view taken substantially in the plane of line V—V in FIG. 3.
Figure 7:
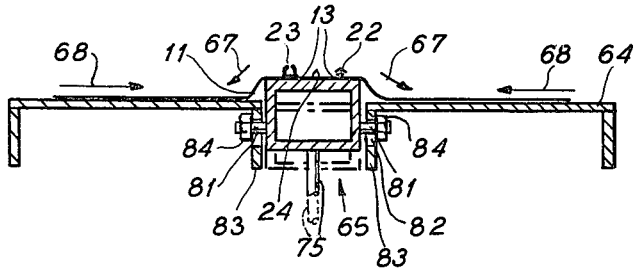
FIG. 7 is an enlarged fragmentary sectional detail view taken substantially along the line VII—VII in FIG. 1.

It will be appreciated, of course, that the fastener strip 13 is applied to only a selected relatively limited, narrow longitudinal area of the relatively wide thin plastic film 11, as is easily visualized in FIGS. 5 and 7. In order to assure that the limited longitudinal area of the film 11 to which the fastener strip 13 is applied will be maintained in a steady, uniform condition free from undesirable stresses or straining forces due to variables that may be present in the body of the film web, the joining area of the film, identified at 24 in FIGS. 5 and 7, is maintained in a smooth, uniform and stable running condition substantially free from any tendencies toward deforming stresses, strains or tensions which might otherwise be imposed on such area by the portions of the film web which extend laterally from the joining area 24. This is accomplished simply and efficiently by supporting the joining area 24 in offset tensioned relation relative to the plane of the remainder of the web 11 at the point of fusion joinder of the fastener strip 13 therewith, and for a sufficient interval after the joinder to assure stabilization of the joined plastic elements.

Means for attaining controlled tensioning of the film area 24 comprises a unique joining roller assembly 25 in the joining station 12. This roll assembly 25 comprises a joining support roller section 27 upon which the joining area 24 of the film is supported in offset relation to the remainder of the film 11. Such remainder of the film 11 is supported by roller sections 28 which are of smaller diameter than the roller section 27 and disposed at the opposite sides thereof. All of the roller sections 27 and 28 are conveniently mounted rotatably on a non-rotating shaft 29 which is carried on bearings 30 permitting torsional adjustment as desired of the shaft 29 by means such as a worm gear assembly 31 operable as by means of a manual handle or adjustment wheel 32. While the roller sections 28 are freely coaxially rotatable on bearings 33 on and about the shaft 29, the roller section 27 is desirably mounted in a manner permitting adjustment of the offset relation relative to the perimeters of the rollers 28 of that portion of the perimeter of the roller 27 on which the web 11 travels in passage through the joining zone or station 12. To this end, the portion of the shaft 29 supporting the roller 27 has fixedly thereon an eccentric hub portion 34 on which the roller 27 is rotatably carried through bearings 35. Thus, by suitably turning the shaft 29 by means of the adjusting worm gear and hand wheel device 31, 32, the degree of offset relation of the perimeter of the roller 27 relative to the rollers 28, especially at the point of joining of the fastener strip 13 with the web area 24 can be efficiently adjusted to accommodate substantially any variable in film gauge, quality, differences in material, and the like, as well as particular requirements as to the film strip relative to the plastic film, throughout a substantial range.

Figure 6:
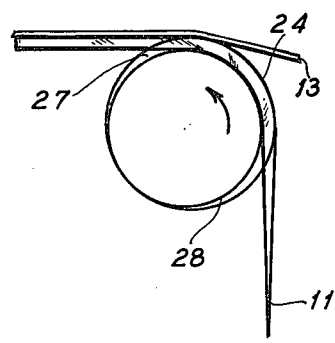
FIG. 6 is a schematic end view taken substantially in the plane of line VI—VI in FIG. 5.

In any event, the fastener strip receiving area 24 of the film 11 is effectively maintained in a uniform smooth stable condition on the offset or raised perimeter of the roller section 27 by a slight tensioning relative to the remainder of the film 11 running on the roller sections 28. FIG. 6 emphasizes the relative offset relation of the film area 24, and in FIG. 5 the arrows 37 indicate the lateral stretching to which the area 24 is subjected by the lateral tension imposed by the drop-off of the portions of the film 11 at the opposite sides of the offset perimeter of the joining roller section 27. This relationship persists in the critical joining portion of the film area 24 even though there may be straining forces generated for any of a number of factors as already described which may be present in the portions of the film 11 carried by the roller sections 28, as indicated by the arrows 38.

Undue chilling of the plastic film area 24 is avoided by having the roller section 27 either formed from a low heat transfer material, or, as shown (FIG. 4) provided with a sleeve 39 of thermally insulating material such as rubber, desirably of a compound, either natural or synthetic, which will avoid fusing or sticking of the plastic material of the film 11 thereto. On the other hand, the roller sections 28 may, as shown be of metal, and hollow, and provided with heating means such as internally mounted heaters 40 to maintain the perimeters of the roller sections 28 at a proper temperature to avoid chilling of the film portions carried by the roller sections 28 and to maintain the film as it is carried on the roller sections 28 limp whereby to attain improved traction between the film and the roller sections and to minimize distorting influences of the film 11 at opposite sides of the joining area 24. In other words, this arrangement improves the film controlling environment in the joining station 12 for the attainment of the desired uniformity of joining results between the fastener strip or strips 13 and the film area 24. Electrical energy for the heaters 40 may be supplied through transfer means 41 corotatively related to the associated roller sections 28 on the shaft 29.

All of the roller sections 27 and 28 are corotatively driven at the same peripheral speed by means comprising a drive shaft 42 (FIG. 2) which is driven at a desirable speed by means such as a motor 43. By way of example, each of the roller sections 28 may be driven by transmission means coupled with the shaft 42, such as respective endless flexible driving elements 44 in the present instance comprising sprocket chains trained over driving sprockets 45 fixed on the shaft 42 and drivingly trained over driven sprockets 47 coaxially fixed to the outer ends of the roller sections 28 and corotative therewith on the stationary shaft 29.

For driving the intermediate roller section 27 independently of the roller sections 28, but having a peripheral speed which is coordinated with the peripheral speed of the rollers 28, friction drive means are provided comprising a friction drive roller 48 (FIGS. 1-3) rotatably carried by a rotary shaft 49 mounted on a rocker carriage 50 pivotally supported as by means of the shaft 42 which rotates freely relative to the carriage. Biasing means such as one or more compression springs 51 thrusts between a fixed shoulder 52 and the carriage 50 to drive the carriage 50 rockably toward the roller section 27 and thereby maintain the friction wheel or roller 48 in driving contact with the frictional periphery 39 of the roller section 27. Driving of the driving roller 48 in proper rotary direction, shown as clockwise in FIG. 3, is effected by means of the shaft 42 through transmission means comprising an endless flexible driving element such as a sprocket chain 53 trained over a driving sprocket 54 fixed corotatively on the shaft 54 and trained over a transmission sprocket carried rotatably on one side of the carriage 50 and driving meshing transmission gears 57 one of which is corotatively attached to the shaft 49. Thereby, although there is not a direct drive from the shaft 42 to the intermediately located roller section 27, such as the drive for the roller sections 28, because the drive roller 48 must rotate in the opposite peripheral direction from the driven roller section 27, the described driving transmission is effective to accomplish the proper direction of rotation of the roller 48 and also the proper speed of rotation thereof for driving the roller section 27 at the proper speed corelated to the roller sections 28.

After joining and fusing of the web 11 and the fastener strip or strips 13 at the joining station 12, care must be taken to avoid distortion or other deterioration of the fastener profile or profiles, and also to avoid distortions in the joining area 24 of the plastic film. To this end, the fusibly joined film and fastener assembly passes from the joining station 12 to and through the conditioning zone 14 where carefully controlled progressive chilling and normalizing of the assembly is effected, to the end that on leaving the chilling zone 14, the now again flat film 11 with the fastener strip or strips 13 permanently secured thereto will pass to and be received between cooperatively rotatably driven film/fastener assembly driving pinch fastener rolls 58 and 59, wherein the roll 59 is desirably provided with one or more peripheral clearance grooves 60 to clear and avoid pinching the fastener profiles, and which may also serve in cooperation with the profiles to guide the film in a straight path of advance from the downstream end of the zone 14 to further processing or windup apparatus. For example, the finished film/fastener assembly may travel directly to bag making apparatus. It will be understood, of course, that the cooperating rolls 58 and 59 are driven at a speed corelated with the driving speed of the drive rolls 17, the preheating roller 19 and the joining roller assembly 25 to maintain a uniform speed of travel of the web 11 through the apparatus.

On leaving the joining roller assembly 25, the still soft fusibly joined web/fastener assembly 11, 13 travels as short as practicable a free distance 61 (FIG. 1) to the upstream end of the chilling and otherwise conditioning zone 14, and through which the plastic assembly is conducted to travel a pathway of sufficient length to assure efficient, progressive cooling and normalizing conditioning of the assembly before it is passed on to the rollers 58 and 59. To this end, the plastic assembly travels through a first conditioning stage 62 in the zone 14 wherein the fastener 13 is properly progressively chilled having regard to its greater unit mass than the film to which it has been joined. Then the plastic assembly moves on through a final finishing stage 63 where final cooling of the assembly, and progressive flattening of the web is accomplished. To this end, there is provided in the zone 14 an elongate cooling table 64 (FIGS. 1 and 7). The table 64 extends continuously longitudinally the full length of the zone 14 starting at its upstream end adjacent to the roller assembly 25 with the film receiving surface tangentially aligned with the perimeters of the roller sections 28.

In order to accommodate the fastener carrying longitudinal area 24 of the film/fastener assembly in a manner to maintain the area 24 in the smooth, uniform, stable condition in which it left the offset perimeter intermediate joining roller section 27, means are provided in assembly with the table 64 to continue the offset relationship of the area 24 to the remainder of the film 11 for a sufficiently extended interval of travel through the zone 14. This will assure that the fastener profiles 22 and 23 will retain their substantially accurate and efficient profile form as well as proper orientation of the profiles relative to the joined film as curing and cooling of the profiles progresses. Ultimately return of the area 24 of the film to the original, e.g., straight across, plane of the film 11 is effected. For this purpose, the table 64 is provided with an intermediate longitudinal conditioning rib structure 63 which is offset, that is raised, relative to the plane of the remainder of the table 64 substantially equivalent to the offset relationship of the perimeter of the intermediate joining roller section 27 relative to the perimeters of the roller sections 28. The width of the rib structure 65 is preferably about the same as the width of the joining roller section 27, so that the web area 24 will receive continuous support during the more or less critical conditioning interval in the zone 14. Such support should be generally equivalent to the offset support provided for the area 24 by the joining roller section 27, such that as demonstrated in FIG. 7, the area 24 will be laterally stretched as indicated by the arrows 67 to remain free from any distorting forces, indicated by the arrows 68, that may be present or may develop in the remainder of the film 11 carried by the table 64 during the conditioning interval.

Figure 8:
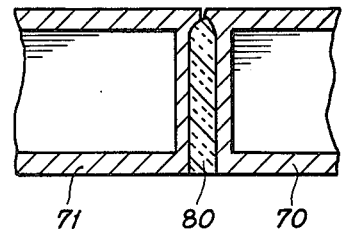
FIG. 8 is an enlarged sectional detail view taken substantially within the balloon area VIII in FIG. 1.

In a preferred construction, the rib 65 comprises a plurality of cooperative sections extending end-to-end, and so related to the table 64 that the offset relation of the web area supporting crown of the rib is properly contoured in longitudinal direction to maintain the offset relation of the web area 24 to the remainder of the web at the proper elevation relative to the web supporting surface of the table 64 to attain the desired result of stabilized support for the web area 24 throughout the length of travel of the web in the zone 14 to the point where the area 24 is permitted to merge toward and with the original plane of the film 11. In addition, the rib 65 is so constructed and arranged that the film area 24 is progressively chilled in an efficient manner having regard to the profile fastener strips 11 carried thereby. For this purpose, means are provided for circulating conditioning fluid through the interior of the rib. Since the web area 24 and the fastener strips carried thereby must be cooled down progressively, the rib 65 is provided with successive sections starting with its upstream end for subjecting the successive sections to conditioning fluid of progressively diminishing temperature gradient in the downstream direction. Therefore, at the upstream end of the rib 65 a self-contained hollow jacket rib section 69 of limited length is aligned with a second such self-contained hollow jacketed section 70 adjacently downstream therefrom, which in turn is aligned at its downstream end with a contiguous similar self-contained hollow jacketed rib section 71 which joins at its downstream end with a substantially longer final self-contained hollow jacketed rib section 72. Each of the rib sections 69, 70 and 71 has in communication with the upstream end of its fluid conditioning chamber a respective conditioning fluid supply duct 73 controlled by a valve 74. Each of the rib sections 69, 70 and 71 has in communication with the downstream end of its conditioning fluid chamber a respective drain-off duct 75. Through this arrangement, the conditioning fluid circulation chamber within the section 69 is adapted to receive conditioning fluid of a relatively elevated temperature, just low enough relative to the newly fused film and fastener strip passing thereto from the joining roll assembly 25 to begin the cool-down of the plastic assembly, followed by similar conditioning fluid action in the rib section 70 wherein the coolant fluid will be at a graduated lower temperature to continue the cool-down or chilling. This is followed in turn by the progressively lower temperature conditioning action of the fluid in the section 71. In the longer final conditioning fluid chamber of the rib section 72, the conditioning fluid is introduced through a supply duct 77 at the downstream end of the section 72 controlled by a valve 78, and drainage of the conditioning fluid from the chamber in the section 72 is through a drain duct 79 at the upstream end of this section. The sequence of cool-down effects of the coolant fluid in the successive rib sections in downstream direction is therefore substantially uniform. In order to avoid heat transfer between the contiguous conditioning fluid chambers, the joints between the rib sections are desirably insulated by suitable insulating means 80 (FIGS. 1 and 8). The conditioning fluid employed may be of any preferred kind, liquid or gaseous, suitable for the purpose, or a combination thereof, as may be preferred.

In order to permit the rib 65 to be adjusted as to elevation with respect to the table 64 in substantial conformance to adjustments that may be effected in the offset relation of the joining perimeter of the intermediate roller section 27 relative to the cooperating web supporting roller sections 28, all of the sections of the rib 65 are mounted for relative adjustment with respect to the plane of the table 64. Means for this purpose may comprise respective laterally projecting studs 81 (FIG. 7) on the sides of the respective sections 69, 70, 71 and 72 of the rib. The studs 81 extend through respective adjustment slots 82 in angular depending flanges 83 on the table 64 alongside and between which the rib 65 is adjustably supported. The adjustment slots 82 extend normal to the plane of the table 64 and permit a substantial range of adjustments of the rib 65 relative to the plane of the table 64 as indicated on comparison of the full line and dash line positions in FIG. 7. Each of the studs may carry means such as a nut 84 by which the desired adjusted position of the associated rib section is adapted to be maintained. Although the downstream end section 72 of the rib may be altogether adjustable by means of the studs 81 and slots 82, the downstream end of the section 72 may, as shown in FIG. 1 be pivotally attached at a pivot point 85.

It may be observed that although the rib sections 69, 70, and 71 may have their crown areas substantially uniformly offset relative to the plane of the table 64, the longer downstream terminal rib section 72 has its crown area progressively diminishing from alignment with the adjacent upstream section 71 to a common plane at the downstream end of the section 72 with the plane of the table 64. Thereby as the chilling of the web area 24 progresses in the downstream travel of the web to the point of independent stability, the area 24 is permitted to return substantially to the original plane of the web 11.

In addition to the cooling of the film-engaging base portions of the fastener strips 13, and more particularly the profiles 22 and 23 by contact with the progressively cooling crown surfaces of the rib 65, due to the more massive cross-section of the profiles 22 and 23, additional coolant, preferably air, is impinged onto the profiles in a generally downstream direction from preferably a succession of nozzles 87. One such nozzle may be directed to impinge the profiles as they travel along the rib section 70, another nozzle 87 may be directed to impinge the profiles as they travel along the succeeding rib section 71, and a plurality of the nozzles 87 may be exposed in successively spaced relation along the upstream portion of the rib section 72. The nozzles 87 over the sections 70 and 71 may be located at a somewhat higher elevation than the nozzles 87 over the section 72, and the nozzles over the section 72 are desirably located successively closer to the profiles to complete the cooling of the profiles.

It will be understood that variations and modifications may be effected without departing from the spirit and scope of the novel concepts of this invention.

I claim as my invention:

1. A method of joining a plastic fastener strip continuously to a film, comprising:
    running a film of substantial width continuously longitudinally through a joining station;
    offsetting a selected longitudinal joining area of the film relative to and from the plane of the remainder of the film as the film runs through said joining station, and thereby maintaining said selected longitudinal joining area of the film in a stable tensioned condition;
    and joining and securing to said tensioned joining area in said joining station, a fastener strip running in the same direction and at the same speed as said film.

2. A method according to claim 1, comprising running said film over a joining roller assembly having a roller section of a width to engage said joining area, and effecting said offsetting by engaging said joining area with said roller section.

3. A method according to claim 2, wherein said roller section comprises roller means of larger diameter than other roller means of said roller assembly, and adjusting said roller section for predetermined offsetting of a film area engaging perimeter portion of said roller section relative to adjacent perimeter area of said remaining roller means.

4. A method according to claim 1, which comprises heating said film prior to joining said fastener strip therewith.

5. A method according to claim 4, comprising extruding said fastener strip adjacent to said joining station, and effecting the joining of the fastener strip to said film joining area while the fastener strip is still in a fusible state, and in said joining station effecting fusing of the fastener strip to said joining area.

6. A method according to claim 5, comprising effecting progressive cooling of said joining area and joined fastener strip downstream relative to said joining station.

7. A method according to claim 6, comprising maintaining said joining area tensioned relative to the remainder of the film as said cooling is effected.

8. A method according to claim 7, comprising progressively releasing said joining area from said tensioning relative to the remainder of the film after said joining area and the profile strip joined thereto have been cooled sufficiently to avoid distortions from stresses that may be imposed by the remainder of the film.

9. Apparatus for joining a plastic fastener strip continuously to a web, comprising:
    means for running a film of substantial width continuously longitudinally through a joining station;
    means for offsetting a selected longitudinal joining area of said film relative to and from the plane of the remainder of the film as the film runs through said joining station, and for maintaining said selected longitudinal joining area of the film in a stable tensioned condition while the film runs through said joining station;
    and means for effecting joining and securing to said tensioned joining area in said joining station a fastener strip running in the same direction and at the same speed as said film.

10. Apparatus according to claim 9, comprising a joining roller assembly in said joining station and said joining roller assembly having a roller section of a width to engage said joining area, said roller section being effective to offset said joining area by engagement with said roller section.

11. Apparatus according to claim 10, wherein said roller section comprises roller means of larger diameter than other roller means of said roller assembly, and means for adjusting said roller section for predetermined offsetting of a film area engaging perimeter portion of said roller section relative to adjacent perimeter area of said remaining roller means.

12. Apparatus according to claim 9, including means for heating said film prior to joining of said fastener strip therewith.

13. Apparatus according to claim 12, comprising extruding means for extruding said fastener strip adjacent to said joining station, whereby to effect joining of the fastener strip to said film joining area while the fastener strip is still in a fusible state, so that fusing of the fastener strip to said joining area is adapted to be effected in said joining station.

14. Apparatus according to claim 13, including means for effecting progressive cooling of said joining area and the fastener strip joined thereto downstream relative to said joining station.

15. Apparatus according to claim 14, including means for maintaining said joining area tensioned relative to the remainder of the film as said cooling is effected.

16. Apparatus according to claim 15, wherein said means for maintaining said joining area tensioned effects progressive release of said joining area from said tensioning relative to the remainder of the film after said joining area and the profile strip joined thereto have been cooled sufficiently to avoid distortions from stresses that may be imposed by the remainder of the film.

17. A method of joining a plastic fastener strip continuously to a film, comprising:
running a film of substantial width continuously longitudinally through a joining station;
in said joining station running said film on a joining roller assembly having a section of larger diameter than other portions of the roller assembly;
engaging a selected longitudinal joining area of the film on said larger diameter section and thereby effecting tensioning of said joining area;
supporting the remainder of the film on said remaining portions of said roller assembly;
extruding a fastener strip adjacent to said joining station and joining the fastener strip while still in a state of fusion with said joining area running over said larger diameter roller section;
downstream from said roller assembly running said film on and along a cooling table while maintaining said longitudinal joining area tensioned relative to the remainder of the film;
progressively cooling said joining area and said fastener strip joined thereto;
and after said area and said fastener strip have been cooled at a stable condition, returning said area to substantially the original plane of said film.

18. Apparatus for joining a plastic fastener strip continuously to a web, comprising:
means for running a film of substantial width continuously longitudinally through a joining station;
a joining roller assembly in said joining station, and said roller assembly having a section of larger diameter than other portions of the roller assembly;
said larger diameter section engaging a selected longitudinal joining area of the film for effecting tensioning of said joining area, the remainder of the film being supported on said remaining portions of the roller assembly;
means for extruding a fastener strip adjacent to said joining station for joining the fastener strip while still in a state of fusion with said joining area running over said larger diameter roller section;
a cooling table downstream from said roller assembly and over which said film is adapted to run following said joining station;
said table having means associated therewith for maintaining said longitudinal film joining area tensioned relative to the remainder of the film;
means for progressively cooling said joining area and said fastener strip joined thereto;
and said tensioning means associated with said table being constructed and arranged for returning said joining area to substantially the original plane of said film after said joining area and said fastener strip have been cooled to a stable condition.

19. Apparatus for joining a plastic fastener strip continuously to a web, comprising:
means for running a film of substantial width continuously longitudinally through a joining station;
a joining roller assembly in said joining station;
said roller assembly comprising a roller section of larger diameter than companion roller sections;
said larger diameter roller section comprising means for maintaining a selected longitudinal area of said film in a stable tensioned condition relative to the remainder of the film as the film runs through said joining station;
means for driving all of said roller sections at a common peripheral speed;
and means for effecting joining and securing to said tensioned joining area in said joining station a fastener strip running in the same direction and at the same speed as said film.

20. Apparatus for joining a plastic fastener strip continuously to a web, comprising:
means for running a film of substantial width continuously longitudinally through a joining station;
means for maintaining a selected longitudinal joining area of the film in a stable tensioned condition relative to the remainder of the film as it runs through said joining station;
means for effecting joining and securing to said tensioned joining area in said joining station a fastener strip running in the same direction and at the same speed as said film;
an elongate table assembly downstream from said joining station, and on which table assembly said film and said fastener strip joined thereto are caused to travel in longitudinal direction;
and means for progressively temperature conditioning said joining area and said joined fastener strip as the same travel along said table assembly.

21. Apparatus according to claim 20, wherein said means for progressively conditioning comprise a longitudinally aligned series of conditioning fluid chambers underlying the path of travel of said area along the table.

22. Apparatus according to claim 21, wherein said series of conditioning chambers comprise a rib offset from the normal plane of said table.

23. Apparatus according to claim 20, wherein said conditioning means comprise direct heat transfer contact surface underlying said film area and the fastener strip joined thereto, and blower means for discharging conditioning fluid onto the fastener strip as it travels along said direct contact surface.

24. Apparatus for joining a plastic fastener strip continuously to a web, comprising:

means for running a film of substantial width continuously longitudinally through a joining station;

means for maintaining a selected longitudinal joining area of the film in a stable tensioned condition relative to the remainder of the film as it runs through said joining station;

means for effecting joining and securing to said tensioned joining area in said joining station a fastener strip running in the same direction and at the same speed as said film;

a conditioning zone downstream from said joining station;

said conditioning zone comprising elongate surface means for supporting said film in longitudinal travel on said surface means;

and said surface means including an elongate surface area offset relative to the remainder of said surface means and underlying and maintaining said film joining area tensioned relative to the remainder of the film while undergoing conditioning in said conditioning zone.

25. Apparatus according to claim 24, wherein said offset surface area is adjustable in its offset relation to said remainder of said surface means.

* * * * *